United States Patent [19]

DePakh

[11] Patent Number: 4,512,325

[45] Date of Patent: Apr. 23, 1985

[54] EMISSION CONTROL DEVICE

[76] Inventor: Stephan DePakh, 90 Warren Rd., Suite 110, Toronto, Ontario M4V 2S2, Canada

[21] Appl. No.: 588,739

[22] Filed: Mar. 12, 1984

[51] Int. Cl.$^3$ ............................................. F02M 25/06
[52] U.S. Cl. ...................................... 123/572; 123/573
[58] Field of Search ............. 123/572, 573, 574, 41.86

[56] References Cited

U.S. PATENT DOCUMENTS

| | | | |
|---|---|---|---|
| 3,362,386 | 1/1968 | McMahon | 123/573 |
| 3,846,980 | 11/1974 | DePalma | 123/573 |
| 4,269,607 | 5/1981 | Walker | 123/573 |

FOREIGN PATENT DOCUMENTS

| | | | |
|---|---|---|---|
| 115638 | 7/1926 | Switzerland | 123/573 |
| 2118861 | 11/1983 | United Kingdom | 123/573 |

Primary Examiner—Ronald H. Lazarus
Attorney, Agent, or Firm—Sim & McBurney

[57] ABSTRACT

This invention provides the combination of a gas-mixing chamber, and a first conduit connected to the crankcase of an engine and passing through the chamber in non-communicating fashion, the conduit then extending out of the chamber and returning to open into the chamber. The first conduit is of copper or at least has its inner wall made of copper. A second conduit leads from the chamber and connects to the intake manifold of the engine. A third conduit leads from the chamber and receives heated gas from the exhaust pipe or manifold. A fourth conduit leads from the mixing chamber and is adapted for connection to the air filter of the engine.

8 Claims, 1 Drawing Figure

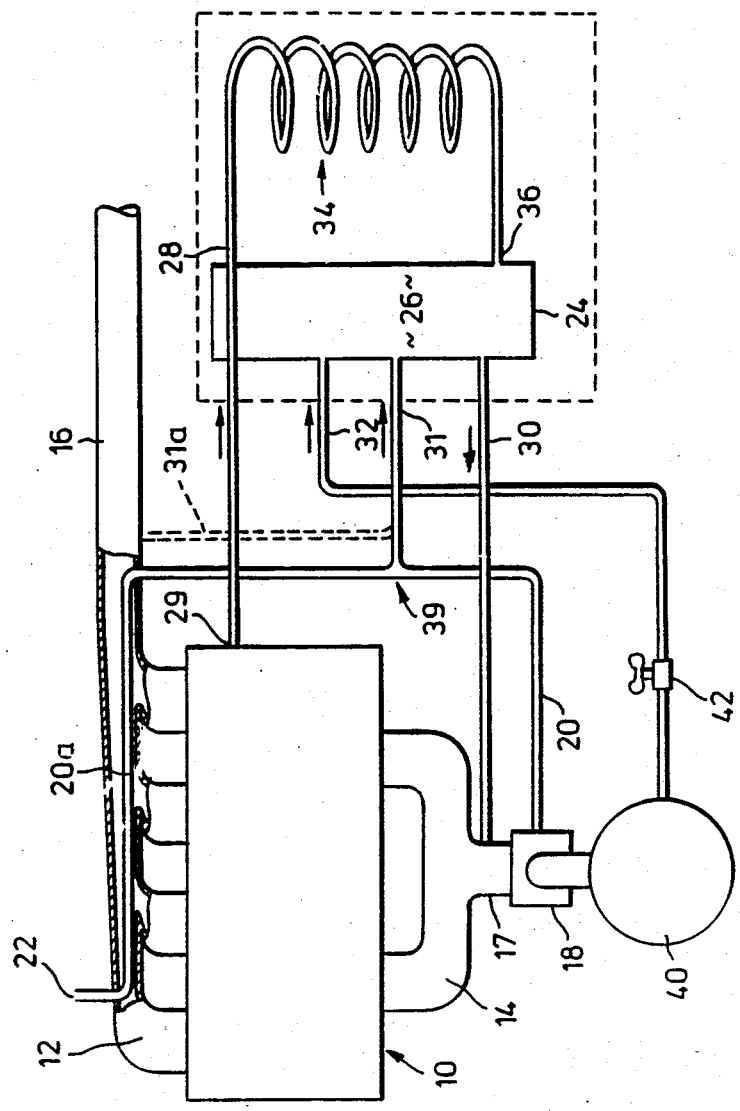

EMISSION CONTROL DEVICE

This invention relates to devices for reducing the emission of pollutant gases from reciprocating internal combustion engines.

It is well known that one of the major sources of air pollution from an internal combustion engine, particularly in an automobile, are the emission of gases resulting from so called "blow-by" of gases between the cylinder wall and piston rings into the crankcase. Such gases have commonly been vented to atmosphere through a suitable vent pipe.

In order to solve the problem of air pollution resulting from the above source, it has been proposed to couple the vent pipe leading from an engine crankcase to the intake manifold where vacuum conditions normally exist. Thus the pollutant gases are immediately drawn back into the intake manifold of the engine and are burned in the combustion process in the cylinders.

However, due to varying vacuum conditions in the intake manifold of an automobile engine, devices of known type have not proven successful. Typically, for example, a greater amount of blow-by is liable to occur during acceleration of the engine. Simultaneously, however, vacuum in the intake manifold decreases thus reducing the capacity of the engine to draw in the crankcase emissions. Also the addition of crankcase gases to the charge fed to the engine disturbs the air/fuel mixture entering the cylinders with adverse effects.

Further, some prior art devices, in addition to leading crankcase emissions directly into the intake manifold, have provided an air intake to the crankcase so that under condition of high vacuum, air could be drawn through the crankcase to ventilate it. However, such systems are considered dangerous due to the possibility of creating an explosive mixture of gases in the crankcase.

According to the present invention, in order to approach a solution to the above problems of prior art devices, there is a provided, in combination: means defining a gas-mixing chamber, a first conduit having one end adapted for connection to the crankcase of an engine, the primary conduit passing in non-communicating fashion through said chamber so that gases in said chamber contact the outside of the conduit, the conduit opening at its other end into said chamber, the first conduit being such that its inner wall is of copper, a second conduit leading from said chamber and being adapted for communication with the intake manifold of the engine, a third conduit leading from said mixing chamber and receiving a gas which has been heated by exhaust heat, and a fourth conduit leading from said mixing chamber and being adapted for connection to the air filter of the engine.

The invention is illustrated schematically in the attached drawing, which shows an internal combustion engine in plan, together with the various components of the accessory provided by this invention.

In the FIGURE, an engine 10 is seen in plan, and includes a head and a crankcase one above the other, such that they are in alignment in the view of the FIGURE. An exhaust manifold 12 and an intake manifold 14 of the usual construction are provided, the exhaust manifold 12 emptying into an exhaust pipe 16, and the intake manifold 14 being connected by a short pipe 17 to a carburettor/choke device 18. A line 20 extends from the choke of a carburettor/choke 18, and passes into and along the exhaust manifold 12, ultimately opening at the location 22 through the wall of the exhaust manifold 12. The line 20 draws atmospheric air from the location 12 into the choke. By drawing it through the exhaust manifold 12, the atmospheric air is pre-heated.

The accessory provided by this invention is that illustrated within the broken-line rectangle in the FIGURE.

This accessory includes, in combination, means 24 defining a gas mixing chamber 26, a first conduit 28 having one end for connection to the crankcase of the engine 10, and second, third and fourth conduits 30, 31 and 32, respectively. The purposes of all of these conduits will become clear subsequently.

Returning to the first conduit 28, it will be seen that this passes in non-communicating fashion through the chamber 26 so that any gases in the chamber 26 can contact the outside of the conduit 28. This arrangement is made for heat-transfer purposes. The conduit 28 then has a relatively extended portion 34, the specific length of which will be dealt with later, following which it opens at its other end 36 into the chamber 26. The means defining the chamber 26 would typically be a metallic wall surrounding the chamber, and therefore the first conduit 28 opens at its other end through that wall.

The first conduit is such that its inner wall is of copper, and preferably the entire conduit 28 is of copper.

The second conduit 30 leads from the chamber 26, and in the FIGURE is connected to the pipe 17 which is a part of the intake manifold 14.

The third conduit 31 leads from the chamber 26 and makes a T-connection into the pipe 20 at the location 39.

The fourth conduit 32 leads from the chamber 26 and is adapted for connection to the standard air filter 40 of the engine.

Preferably, there is a control valve 42 provided in the fourth conduit 32.

It has been found that the first conduit 28 should be substantially about 7 feet (2.2 meters) in total length. Naturally, some variation from this ideal length is possible, but a reasonably lengthy first conduit 28 appears to be beneficial in terms of increasing the mileage of automobiles to which this accessory device is attached.

The second conduit 30 is that through which the mixture of gases within the chamber 26 passes into the pipe 17 and thence into the intake manifold 14. This conduit may be of rubber, and typically an inside diameter of 8 mm would be satisfactory for the rubber tube constituting this conduit.

The third conduit 31 is that which is connected to the engine choke pipe 20 with a T-connection, as aforesaid. In the solid line connection illustrated, the conduit 31 allows heated air from the pipe 20 to be drawn into the chamber 26. In certain instances of older engines, the portion 20a of the pipe 20 within the exhaust manifold 12 is rusted or cracked, and exhaust gases can be drawn into the pipe 20. This invention is also directly applicable to such a situation. It is not a disadvantage to draw exhaust gases into the chamber 26, since the exhaust gases often include certain unburned components, which can be drawn back through the engine and burned on a second pass. If the pipe 20 is not deteriorated in the portion 20a, or if the vehicle does not have such a pipe, then the alternative conduit 31a shown in broken lines may be employed. Conduit 31a is connected directly to and opens into the exhaust pipe 16 close to the exhaust manifold 12.

The third conduit 31 may be of rubber, and may conveniently be of rubber tubing with a 3 mm inside diameter. It will be understood that the third conduit 32 is essentially intended to tap a source of heat for the mixture within the chamber 26, although naturally the heat must be conveyed in a gas of some kind. The heated gas, whether air or exhaust fumes, is of course supplied by the pipe 20 or the conduit 31a.

The fourth conduit 32 is intended to draw filtered atmospheric air from the air filter 40 of the car, and the quantity of air being drawn in is intended to be adjusted by means of the valve 42.

The fourth conduit 32 may again be of a rubber tubing, conveniently having an inside diameter of about 5 mm.

A further connection may be made to the mixing chamber 26, which may be either closed or may be connected to a standard emission control device. Such a connection has not been illustrated in the FIGURE.

Experiments have indicated that the first conduit 28 should be relatively long. A length of about 7 feet (approximately 2.2 meters) has been found satisfactory, but is not considered to be strictly limiting. It is considered that this relative length is necessary in order to allow certain catalytic reactions to take place in the gases drawn from the crankcase, prior to the admission of these gases into the chamber 26.

It is contemplated to adapt this invention to make use of the EGR (exhaust gases recycling) connection in some of the more recent vehicle models.

An auxiliary device meeting the above description was connected to a number of automobiles during 1977 and during 1979. The detailed cases are given below, and are exemplary of the advantages to be attained by use of the auxiliary device provided herein.

EXAMPLE 1

Pollutant emission tests were carried out by the Vehicle Emissions Section of the Ontario Ministry of the Environment on a 1970 Ford Galaxie 500. The tests were carried out on the vehicle before and afer installation of the device constructed in accordance with the foregoing specification.

| Test | Carbon Monoxide | | Hydrocarbons | |
|---|---|---|---|---|
| | % volume | grams/mile | parts per million | grams/mile |
| Without device installed | 1.75 | 41.7 | 226 | 2.9 |
| With device installed | 0.15 | 3.6 | 163 | 2.1 |

EXAMPLE 2

Driving tests were carried out on Nov. 12, 1977 on a 1966 Oldsmobile Delta 88, with and without the installation of a device meeting the above description. The test distance was 39 miles along Highway 403 and the QEW between Hamilton and Oakville. The vehicle speed was maintained at 50-55 mph. The weather temperature was −1° C. Prior to the test, the automobile had undergone hydraulic valve lifter replacement and valve work.

| Test | Test distance | Gas consumed | Miles/Gal |
|---|---|---|---|
| With device installed | 39.0 miles | 2.15 Imp. gallons | 18.1 |
| Without device installed | 39.0 miles | 2.45 Imp. gallons | 15.9 |

For this test, a minimum 13% of gas mileage savings was recorded.

EXAMPLE 3

Driving tests were carried out on Aug. 26, 1979 on a 1967 Cadillac vehicle, 340 cubic inches, with and without the installation of an auxiliary device meeting the foregoing specifications. The test distance was 93.4 miles and covered the following route in Ontario: Highway 6 from Dundas to Highway 401, to new Highway 6 bypassing Guelph, to old Highway 6 to about 5 miles beyond Fergus, and returning along the same route. The route was travelled twice, once without and once with the device. The time span for the tests was from about 2:00 p.m. to 8:00 p.m. The weather was overcast, with the temperature varying between 23° and 26° C. The speed was maintained generally at 50-60 pmh but included 70 mph for one minute on a stretch of Highway 401 and idling at a few stoplights. The car underwent no prior tuneup or carburettor adjustments.

| Test | Test distance | Gas consumed | Cost of gas | Miles per liter |
|---|---|---|---|---|
| without device installed | 93.4 miles | 25.2 liters | $5.54 | 3.71 |
| with device installed | 93.4 miles | 19.4 liters | $4.26 | 4.81 |

For this test, the savings in gas consumed and in cost was 23%.

EXAMPLE 4

On Sept. 2, 1979, a 1968 Buick Riviera (430 cubic inches) was tested with and without the installation of a device meeting the foregoing specification. The test distance as measured by the vehicle odometer was 92.4 miles along the following route in Ontario: Highway 6 from Dundas to Highway 401, to new Highway 6 bypassing Guelph, to old Highway 6 to about 5 miles beyond Fergus, and returning along the same route. The route was travelled twice, once with and once without the device. The tests were done from 10 a.m. to 4 p.m. The weather was generally overcast with a few light showers and the temperature was 22°-26° C. The speed was maintained generally at 50-60 mph but included stretches at 40-50 mph due to slow traffic and also idling at a few stoplights. This vehicle had had a major tune-up on Aug. 28, 1979, prior to the two tests.

| Test | Test Distance | Gas Consumed | Cost of gas | Miles per liter |
|---|---|---|---|---|
| With device installed | 92.4 miles | 20.9 liters | $4.79 | 4.42 (19.9 miles/gal) |
| Without device installed | 92.4 miles | 28.0 liters | $6.42 | 3.30 (14.9 miles/gal) |

For this test, the savings in gas consumed and in cost was 25.4%.

EXAMPLE 5

Driving tests were carried out on Sept. 2, 1979 on a 1975 Chrysler Plymouth Fury vehicle (318 cubic inches), with and without the installation of a device meeting the above specifications. The test distance as measured by the vehicle odometer was 86.6 miles along the following route in Ontario: Highway 6 from Dundas to Highway 401, to new Highway 6 bypassing Guelph, to old Highway 6 to about 5 miles beyond Fergus, and return along the same route. The route was travelled twice, once with and once without the device. The tests were done from 10 a.m. to 4 p.m. The weather was generally overcast with a few light showers and the temperature about 22°–25° C. The speed was maintained generally at 50–60 mph but included stretches at 40–50 mph due to slow traffic and also idling at a few stoplights. There was no prior tune-up or carburettor adjustment. The standard auto emission unit was not altered in any way during the installation of the device for the first of the two tests below.

| Test | Test Distance | Gas Consumed | Cost of gas | Miles per liter |
|---|---|---|---|---|
| With device installed | 86.6 miles | 9.55 liters | $2.18 | 9.07 (40.8 miles/gal) |
| Without device installed | 86.6 miles | 19.5 liters | $4.46 | 4.44 (20.0 miles/gal) |

For this test, the savings in gas consumed and in cost was 51%.

I claim:

1. An improved internal combustion engine including a crankcase ventilation system, an air filter and an intake manifold, wherein the improvement comprises in combination:

means defining a gas-mixing chamber, a first conduit having one end adapted for connection to the crankcase of the engine and passing in non-communicating fashion through said chamber so that any gases in said chamber contact the outside of the first conduit, the first conduit opening at its other end into said chamber and being such that at least its inner wall is of copper, a second conduit leading from said chamber and being adapted for communication with said intake manifold, a third conduit leading from said mixing chamber and receiving a gas which has been heated by exhaust heat, and a fourth conduit leading from said mixing chamber and being adapted for connection to the air filter of the engine.

2. The invention claimed in claim 1, in which the engine has an automatic choke, and in which said third conduit connects through a T-connection with a pipe that extends from the automatic choke, passes through the exhaust manifold, and opens to the atmosphere.

3. The invention claimed in claim 1, in which said third conduit connects directly to the exhaust pipe and allows hot exhaust gases to be drawn into said chamber.

4. The invention claimed in claim 1, claim 2 or claim 3, in which a control valve is provided in said fourth conduit.

5. The invention claimed in claim 1, claim 2 or claim 3, in which the first conduit is substantially 2.2. meters in total length.

6. The invention claimed in claim 1, claim 2 or claim 3, in which the second, third and fourth conduits are of rubber.

7. The invention claimed in claim 1, claim 2 or claim 3, in which the first conduit is of solid copper having an inside diameter of substantially 6 mm.

8. The invention claimed in claim 1, claim 2 or claim 3, in which the second, third and fourth conduits have inside diameters of substantially 8 mm, 3 mm and 5 mm respectively.

* * * * *